United States Patent [19]
Bauer et al.

[11] 4,388,086
[45] Jun. 14, 1983

[54] INTERCHANGEABLE AND DISPOSABLE FILTER CARTRIDGE AND METHOD OF REMOVING MOISTURE AND OIL FROM COMPRESSED BREATHABLE AIR

[75] Inventors: Heinz Bauer, Munich; Kurt Herter, Eichenau, both of Fed. Rep. of Germany

[73] Assignee: Bauer-Kompressoren GmbH, Munich, Fed. Rep. of Germany

[21] Appl. No.: 297,233

[22] Filed: Aug. 28, 1981

Related U.S. Application Data

[63] Continuation-in-part of Ser. No. 123,996, Feb. 25, 1980, abandoned, which is a continuation of Ser. No. 938,411, Aug. 31, 1978, abandoned.

[30] Foreign Application Priority Data

Sep. 9, 1977 [DE] Fed. Rep. of Germany ... 7727993[U]

[51] Int. Cl.³ .............................................. B01D 53/02
[52] U.S. Cl. ........................................ 55/75; 55/389; 55/316; 55/441
[58] Field of Search ................ 55/275, 97, 74, 75, 55/387, 323, 388, 389, 316, 441

[56] References Cited

U.S. PATENT DOCUMENTS

| | | | |
|---|---|---|---|
| 2,096,851 | 10/1937 | Fricke | 55/316 |
| 3,252,270 | 5/1966 | Pall et al. | 55/316 |
| 3,464,186 | 9/1969 | Hankison | 55/316 |
| 3,766,660 | 10/1973 | Settlemeyer | 55/74 |
| 3,791,105 | 2/1974 | Rhodes | 55/97 |
| 4,015,959 | 4/1977 | Grote | 55/316 |
| 4,231,768 | 11/1980 | Seibert | 55/387 |

FOREIGN PATENT DOCUMENTS 2003743A 3/1979 United Kingdom ................. 55/387

*Primary Examiner*—Bernard Nozick
*Attorney, Agent, or Firm*—Hauke and Patalidis

[57] ABSTRACT

A three-stage disposable filter cartridge for filtering a gaseous fluid, especially breathable compressed air, and consisting of a preferably cylindrical housing having at least an inlet and an outlet, the interior of the housing being provided with a plurality of concentrically disposed separate chambers containing different types of filtering media and mutually arranged such that the fluid to be filtered flows sequentially through the individual chambers one after another in a labyrinth-like path. The first chamber contains a filtering medium providing coarse de-humidification of the fluid, the second chamber contains an oil vapor adsorbing medium and the third chamber contains a fine de-humidification medium.

4 Claims, 2 Drawing Figures

4,388,086

INTERCHANGEABLE AND DISPOSABLE FILTER CARTRIDGE AND METHOD OF REMOVING MOISTURE AND OIL FROM COMPRESSED BREATHABLE AIR

CROSS-REFERENCE TO RELATED APPLICATION

The present application is a continuation-in-part of application Ser. No. 123,996, filed Feb. 25, 1980 now abandoned which is a continuation of application Ser. No. 938,411, filed Aug. 31, 1978, and now abandoned.

BACKGROUND OF THE INVENTION

It is known to provide filter cartridges with concentric filtering chambers, as disclosed, for example, in U.S. Pat. No. 3,791,105. Due to the concentric arrangement of the filtering chambers for the individual filtering materials and the consequent labyrinth-like flow pattern in the filtering device, the distance to which the filtrate is forced to travel is much longer than the distance in filter types in which each individual filtering medium extends over the entire cross-sectional area of the filter cartridge. It is well known that the longer the filtering distances the better is the resulting filtering effect.

The above-mentioned U.S. patent discloses a filtering device providing a two-stage filtering of a gaseous fluid. Even though the concentrically mounted chambers, in that device, accommodate filtering media of different materials and of at least different densities, both filtering stages provide only oil removal from the gaseous fluid.

In U.S. Pat. No. 3,464,186, there is disclosed a dryer for compressed fluid, such as compressed air in an air brake system for a vehicle, which is in the form of two chambers one containing stainless steel mesh acting as both a coarse oil condensing and water condensing medium and the other a desiccant for absorbing water vapor. In U.S. Pat. No. 3,353,339, there is disclosed a straight-through filter through which air flows across a porous hydrophobic membrane removing entrained liquid water and dirt, across a disposable canister filled with an adsorbent medium, such as activated carbon, to remove oil vapor and oil mist, and a filter pad to remove solid fines which may have been picked up during flow through the filter. U.S. Pat. No. 1,896,833 discloses an oil and water extractor having a first chamber containing metal shavings on which liquid oil and liquid water collect and pass by gravity into a lower sediment collecting portion, a second chamber provided with baffles for collecting residual liquid particles, and a third chamber containing a highly porous filtering material. U.S. Pat. No. 4,015,969 discloses an in-line filter for gases, such as air, using two coaxial chambers, the outer chamber containing a coarse filter, such as stainless steel wool to condensate vapors, both oil and water, the drops of liquid falling at the bottom of the filter housing, and a central chamber containing a desiccant.

None of the known prior art, however, is successful in completely removing from a gaseous fluid, such as breathable compressed air, oil mist and water vapor. This is due to the fact that none of the prior art suggest the critical sequence of steps consisting in first removing the majority of the water vapor from the compressed air, which permits the second step of oil removal to be efficiently accomplished, followed by the third step of removing the remaining water vapor.

In many instances, the gaseous fluid to be filtered, especially breathable compressed air, also contain a considerable portion of water vapor. This water vapor, however, renders the oil removal process rather difficult. Consequently, the oil removal characteristics of the prior art filtering devices is relatively poor, such that the air that has been subjected to oil removal in the prior art filtering devices is not suitable, for instance, for breathing purpose. Furthermore, the relatively high content of water vapor that remains in the filtered air is undesirable for many other applications.

It is recognized that filter devices have been known in the past in which different filtering media are positioned sequentially in the direction of fluid flow, and which are also provided with drying means in addition to oil-removal means. However, in these prior art filtering devices, the individual filtering media are always extending over the entire cross-section of the filter cartridge, which results in relatively short filtering travel distances through each filtering medium. Consequently, the filtering effect of those prior art filtering devices is relatively poor. Therefore, adequate oil removal and de-humidification of the filtrate to make it suitable for breathing is not assured with these prior art filtering devices.

SUMMARY OF THE INVENTION

The principal object of the present invention is to provide a simple and effective replaceable and disposable filter cartridge, which overcomes the shortcomings of the prior art filtering devices, and which achieves a high degree of oil removal and de-humidification of a gaseous fluid, such as compressed air for example, which after filtration by the filter cartridge of the invention, is quite suitable for breathing.

Those results are achieved by the present invention by means of a filter cartridge of the concentric chamber type providing a labyrinth-like flow path through a first filtering chamber containing a filtering medium for coarse de-humidification, a second filtering chamber containing an oil-removal medium, and a third filtering chamber containing a medium for fine de-humidification, the compressed air flowing through the chambers in that precise sequence.

The novel filter cartridge of the invention resolves the problem by very simple means. Firstly, the concentric arrangement of the individual filtering chambers containing the different filtering media results in a substantially lengthy filtering path. This structural feature of the filtering cartridge, by itself, provides a much improved filtering process. Secondly, in a filter cartridge according to the present invention, in which the fluid to be filtered is forced to flow through the filtering media in a labyrinth-like path, specific types of filtering media are placed in the individual concentrically disposed filtering chambers in a predetermined sequence, which results in an even more improved filtering process. The over-all improvement in the filtering process results in obtaining a filtered gaseous fluid which is practically free of oil and water vapors and is therefore rendered, among others, especially suitable for breathing purpose.

More specifically, the novel filter cartridge of the invention provides, as the gaseous fluid passes through the initial de-humidification medium, especially an adsorbent of high specific adsorbing capacity, such as silica gel for example, a coarse initial de-humidification of the gaseous fluid. Subsequently, the already substantially de-humidified gaseous fluid passes through the second filtering agent, namely the oil removing agent, which may be activated carbon or any other oil-adsorbing medium. Since the gaseous fluid has already been substantially de-humidified before entering the oil-adsorbing filtering stage, the oil-adsorbing medium works much more effectively. As a result, the oil removal in the oil-removing stage is very thorough. Subsequently, the gaseous fluid, which is now practically free of oil, flows through the fine de-humidifying medium. The fine de-humidifying medium is now capable of working very effectively, since it does not become moistened and covered with oil. The medium for the fine de-humidification step is preferably also an adsorbent, that is one with a very strong affinity to water such as, for example, silica gel, molecular sieve. This permits fine de-humidification to the lowest dew points. The previously described individual filtering steps take place one after the other in filtering stages that are positioned concentrically relative to each other, which results in a labyrinth-like flow path of the gaseous fluid through the filter cartridge, and consequently which results in long filtering traveling distances. Since the individual filtering stages, so described, are operating very efficiently, the filter cartridge according to the invention also has a high degree of operational reliability and an extended effective life.

An embodiment of the invention is characterized by providing three filtering chambers that are concentrically disposed relative to each other, and wherein each of the filtering chambers accommodates one de-humidifying medium, one oil-removal medium, and one final de-humidifying medium respectively. Another embodiment of the invention, which has been found particularly advantageous and suitable, is characterized by a structure consisting of two chambers disposed concentrically. One chamber is divided into two filtering chambers, the first one containing the initial de-humidification medium and the second one containing the oil-removal medium located behind the first de-humidification medium relative to the direction of fluid flow. The third filtering chamber contains the fine de-humidification medium. Since, in the initial de-humidification stage, filtering distances of medium length are usually adequate, it is very advantageous in this embodiment to place the initial de-humidification medium simply in the concentric ring-shaped space of the oil-removal medium proximate to the inlet opening or openings. Also, in this embodiment, there is no need for a cylindrical partition or wall in the filter cartridge housing for defining the third filtering chamber, as is required in the previously mentioned embodiment. Therefore, this embodiment is of a very simple design and at the same time offers good filtering characteristics.

Finally, according to another characteristic of the invention, it is advantageous that the fluid flow cross-sectional area of all the filtering chambers be equal in size. This assures substantially equal flow rates of the filtrate in all the filtering stages and, consequently, provides a straight-forward structure for the filter cartridge, so that the filter cartridge can be designed in a simple manner for optimum filtering effect.

BRIEF DESCRIPTION OF THE DRAWING

The invention will now be described in detail in connection with the embodiments illustrated schematically in the drawing, wherein.

DETAILED DESCRIPTION OF THE PREFERRED EMBODIMENTS

Figure 1:
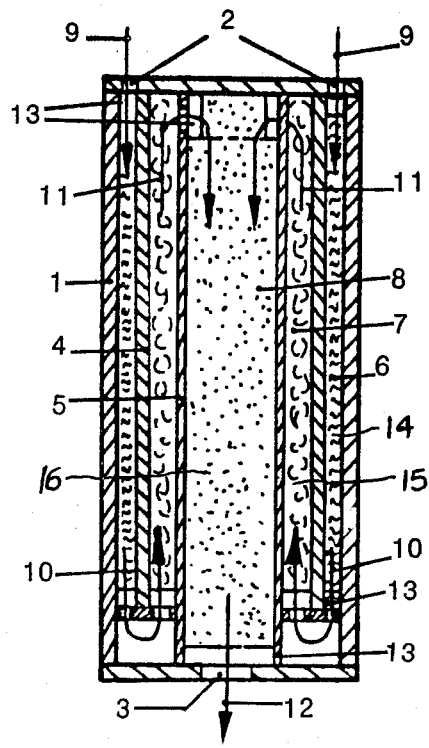
FIG. 1 is a longitudinal cross-section of a disposable filter cartridge according to the invention with three filtering chambers positioned concentrically in relation to each other.
Figure 2:
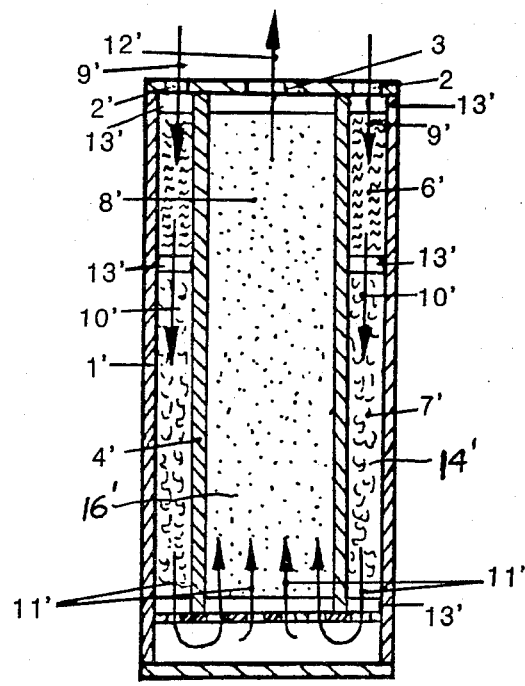
FIG. 2 is an illustration similar to FIG. 1, but showing another embodiment of the filter cartridge according to the invention with two filtering chambers positioned concentrically in relation to each other.

It will be appreciated that the novel filter cartridge of the invention, structural examples of which are illustrated at FIGS. 1 and 2, has for principal purpose the filtering of compressed air by de-humidification and oil removal. The filtered air is used for breathing, for example by scuba divers, underwater workers, firefighters, and miners.

Referring to FIG. 1, an example of interchangeable disposable filter cartridge according to the invention is illustrated as having a cylindrical housing 1, is provided with a pair of inlet openings 2 for introduction therein of the air to be filtered, and with a single outlet opening 3 for the filtered air. In use, the filter cartridge is installed in a casing, not shown, provided with an inlet line forming an outlet communicating with the cartridge inlet openings 2, and with an outlet line having an inlet in communication with the cartridge outlet opening 3. Two cylindrical partition walls 4 and 5 are provided inside the cartridge housing 1. The cylindrical partition walls 4 and 5 are positioned concentrically with respect to the housing 1, such that three concentrically positioned filtering chambers 6, 7 and 8 are formed within the housing 1, each chamber containing a different type of filtering medium. In particular, the first filtering chamber 6 contains an initial coarse de-humidification medium, especially a desiccant in the form of an adsorbent of high specific adsorbing capacity, such as silica gel preferably, or anhydrous calcium chloride, calcium oxide, a diatomaceous earth, for example, the filtering chamber 7 contains an oil removing medium, preferably activated carbon or another oil vapor adsorbing agent, such as finely pulverized clay or the like and the filtering chamber 8 contains a fine de-humidification medium, especially a desiccant with a strong affinity for water vapor, such as, preferably, silica gel of molecular sieve. The compressed air to be filtered entering through the inlet openings 2, as indicated by arrows 9, is directed into the first filtering chamber 6, where it is caused to flow through the initial de-humidification medium contained therein and subsequently, as indicated by arrows 10, enters the filtering chamber 7, where it flows through the oil-removal medium contained in that chamber. Subsequently, the air enters, as indicated by arrows 11, the filtering chamber 8 where it flows through the fine de-humidification medium contained therein. Finally, the filtered air discharges from the filter cartridge, as indicated by arrow 12, through the outlet opening 3.

As can be seen, the filtering chambers 6, 7 and 8 are disposed in three separate enclosures 14, 15 and 16 positioned concentrically relative to one another and are placed in communication with one another through port holes which, for reasons of clarity, are not identified by numerals, in such a manner that the air to be filtered passes through the individual filtering chambers one after the other in a labyrinth-like path. As a result, the filtering distances are relatively long and the filtering action in the individual filtering stages is very effective. Furthermore, the filtering stages operate, individually as well as in combination, at maximum efficiency, especially since the initial coarse de-humidification in the first filtering stage (filtering chamber 6) allows for a better filtering action by the oil-removal medium in the second filtering stage (filtering chamber 7), and this is also true with respect to the fine de-humidification medium in the third filtering stage (filtering chamber 8), thanks to the preceding oil-removal step. Consequently, the novel selection of the individual filtering media and the sequential filtering steps also provide for a further improvement in the filtering effect.

It should also be noted that the inlet openings 2, the port holes between the individual filter stages, as well as the outlet opening 3, are all provided with suitable felt disks 13 in order to prevent accidental loss of the individual filtering media through these openings.

The filter cartridge shown at FIG. 2 has basically the same structure and functions in the same manner as the one shown at FIG. 1 and, therefore, the corresponding elements in FIG. 2 have been given the same referene numerals as in FIG. 1, except that such reference numerals have been primed as compared to the numerals in FIG. 1 in order to distinguish them from the numerals in FIG. 1. However, the example of structure illustrated at FIG. 2 is provided with only two concentrically disposed enclosures, namely an outer enclosure 14' providing the consecutive chambers 6' and 7', and an inner enclosure 16' containing the separate chamber 8', the two enclosures being separated from each other by a cylindrical wall 4', that is disposed concentrically with respect to the housing 1'. In the embodiment of FIG. 2, the outer filtering chambers 6' and 7', in the outer compartment 14' contain the coarse de-humidification medium (sectional filtering chamber 6') and disposed immediately behind said coarse de-humidification medium in the fluid flow path there is the oil-removal medium (sectional filtering chamber 7'). The fine de-humidification medium is disposed inside the inner filtering chamber 8' in the inner enclosure 16'.

The compressed air to be filtered enters the sectional outer filtering chambr 6' via the inlet openings 2', as indicated by arrows 9', passes through the coarse de-humidification medium disposed in the filtering chamber 6', and subsequently enters the sectional filtering chamber 7', as indicated by arrow 10' by passing through the felt disk 13' located between said de-humidification medium and the oil-removal medium. The air flows through the oil-removal medium contained in the chamber 7', and then enters, as indicated by arrows 11', the filtering chamber 8' which contains the fine de-humidification medium. After passing through the fine de-humidification medium, the filtered compressed air discharges from the filter cartridge in the direction of arrow 12' through the outlet opening 3'.

The embodiment illustrated in FIG. 2 has proved to be very satisfactory under actual operating conditions, even though only two concentrically disposed compartments containing the three consecutive filtering chambers are being employed. While this feature may shorten the labyrinth-like path taken by the fluid to be filtered through the filter cartridge, the shorter path is of no great consequence, since medium filtering distances are also adequate, especially in the coarse de-humidifying stage. Therefore, satisfactory over-all filtering results are obtained even with the simplified embodiment according to FIG. 2.

In filter cartridges according to the invention it is of practical advantage that the fluid flow cross-sectional areas of all filtering chambers 6, 7 and 8, or 6', 7' and 8' be equal in size. This assures substantially equal flow ratess and neatness in arrangement in the filtering cartridge that is thus rendered suitable for optimum design.

It will be appreciated by those skilled in the art that although the filter cartridge housing 1 or 1' has been hereinbefore referred to as being cylindrical, and is preferably circularly cylindrical, such housing may nevertheless have any other cylindrical shape such as being oval, square or rectangular in transverse section, and yet be provided with concentric filtering chambers, of the same general cross-section shape as the housing 1 or 1', or of any other convenient shape different from that of the housing.

Interchangeable and disposable filter cartridges according to the present invention may be made in any convenient size. Because of the high efficiency of filter cartridges according to the present invention for removing both oil mist and water vapor from breathable compressed air, the cartridges can be made in relatively small sizes, while still providing a relatively long path through each filtering medium in each chamber. For example, a filter cartridge according to the structure of FIG. 1, 17 cm. in length and 7.75 cm. in diameter provides a path of more than 14 cm. through the outer filtering chambers 6 and 7, and a path length of more than 15 cm. through the central filtering chamber 8. A filtering cartridge, according to the structure of FIG. 2, of the same outer dimensions, provides a path length of more than 14 cm. in the central chamber 8' and path lengths of respectively 5 cm. and 9 cm. in the chambers 6' and 7', although it will be readily apparent that the path lengths of the fluid through the chambers 6' and 7', respectively, may be made equal, about 7 cm. each.

Having thus described the present invention by way of examples of structural embodiments thereof, modifications whereof will be apparent to those skilled in the art, what is claimed as new is as follows:

1. A three-stage interchangeable filter cartridge for removing oil and moisture from compressed breathable air, said filter cartridge comprising a housing having at least one inlet and one outlet for said compressed air to be filtered by flowing through said housing from said inlet to said outlet, three chambers at least two of which are concentrically disposed in said housing and placed in serial communication with each other such that the compressed air to be filtered is sequentially circulated through the individual chambers in a labyrinth-like path for providing relatively long filtering travel of said compressed air, a first adsorbent filtering medium of high specific adsorbing capacity in the first of said chambers providing coarse de-humidification of said compressed air, a second adsorbent filtering medium of oil vapor adsorbing agent in the second of said chambers providing removal of oil from said compressed air and a third adsorbent filtering medium in the third of said chambers having a strong affinity for water vapor and providing a fine de-humidification of said compressed air, said first, second and third adsorbent filtering media being separated by air-pervious separators and disposed sequentially each in one of said chambers to cause said compressed air to flow sequentially through said first, second and third adsorbent filtering media.

2. The filter cartridge of claim 1 wheren said filtering chambers have equal cross-sectional fluid flow areas.

3. The filter cartridge of claim 1 wherein said housing is cylindrical and the first and second of said chambers are in a single enclosure concentrically disposed relative to said third chamber and said single enclosure contains sequentially said first medium and said second medium providing respecively coarse de-humidification and oil-removal, said oil-removal medium being separate and placed behind said coarse de-humidifying medium in the fluid flow path, said third chamber containing said third medium providing fine de-humidification.

4. The method of removing oil and water vapor from breathable compressed air consisting of the steps of passing said compressed air through a first adsorbent filtering medium providing removal of the majority of said water vapor from said compressed air, thereafter passing the thus coarsely de-humidified compressed air through a second adsorbent filtering medium providing adsorption removal of oil from said compressed air, and thereafter passing the thus coarsely de-humidified compressed air from which oil has been removed through a third adsorbent filtering medium providing removal of the remaining of said water vapor from said compressed air, whereby said compressed air having passed through said first, second and third adsorbent filtering media in sequence is substantially oil-free and moisture-free and wherein said first, second and third adsorbent filtering media are disposed each in one of three separate chambers in a single housing, at least two of said chambers being concentrically disposed in said housing and said three chambers being placed in serial communication with each other such that the compressed air to be filtered is sequentially circulated through the individual chambers in a labyrinth-like path for providing relatively long filtering travel of said compressed air, said first, second and third adsorbent filtering media being separated by air-pervious separators.

* * * * *